Aug. 22, 1950            A. REDLER            2,519,929
BIN DISCHARGING APPARATUS
Filed Aug. 30, 1949            3 Sheets-Sheet 1
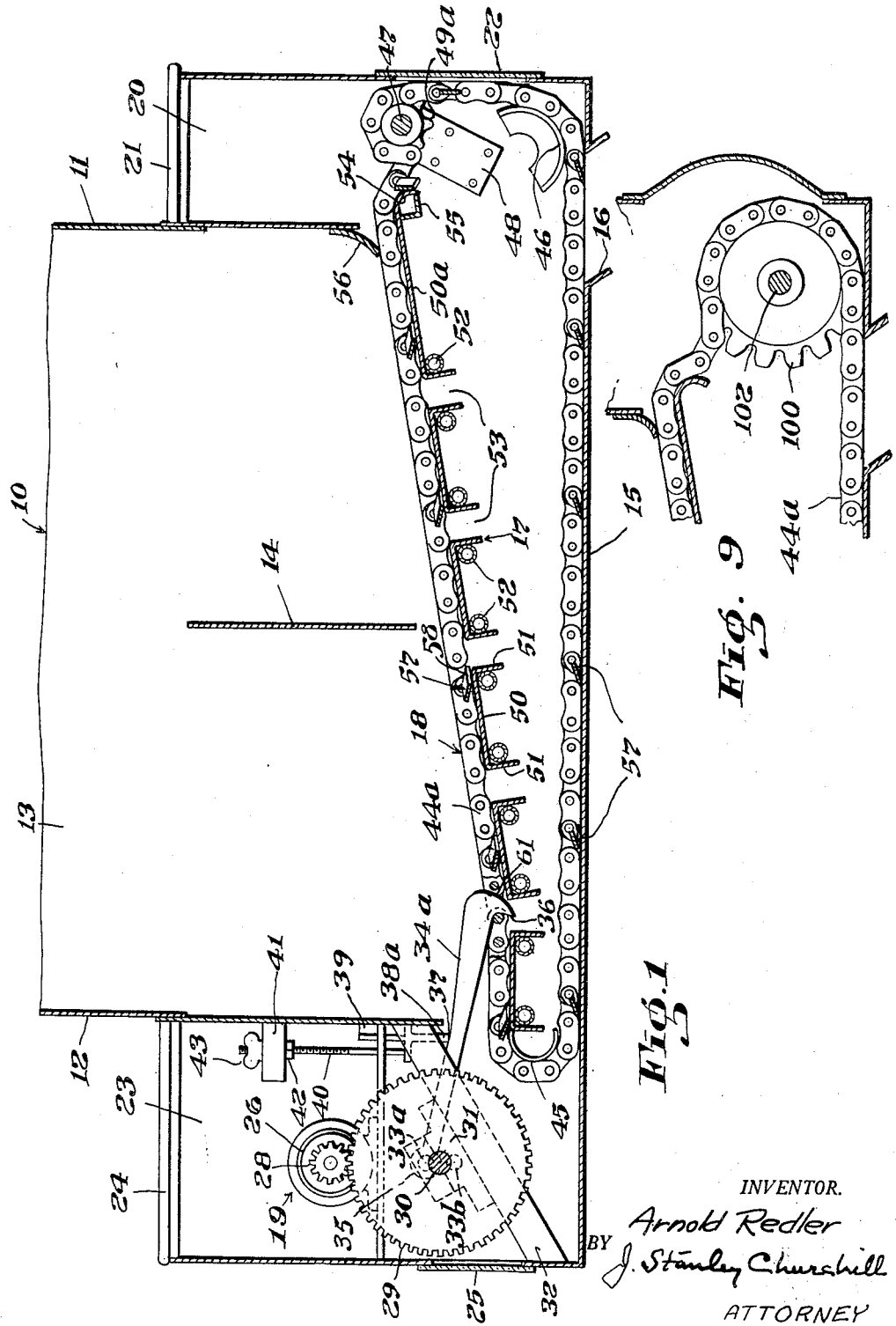
INVENTOR.
Arnold Redler
BY J. Stanley Churchill
ATTORNEY

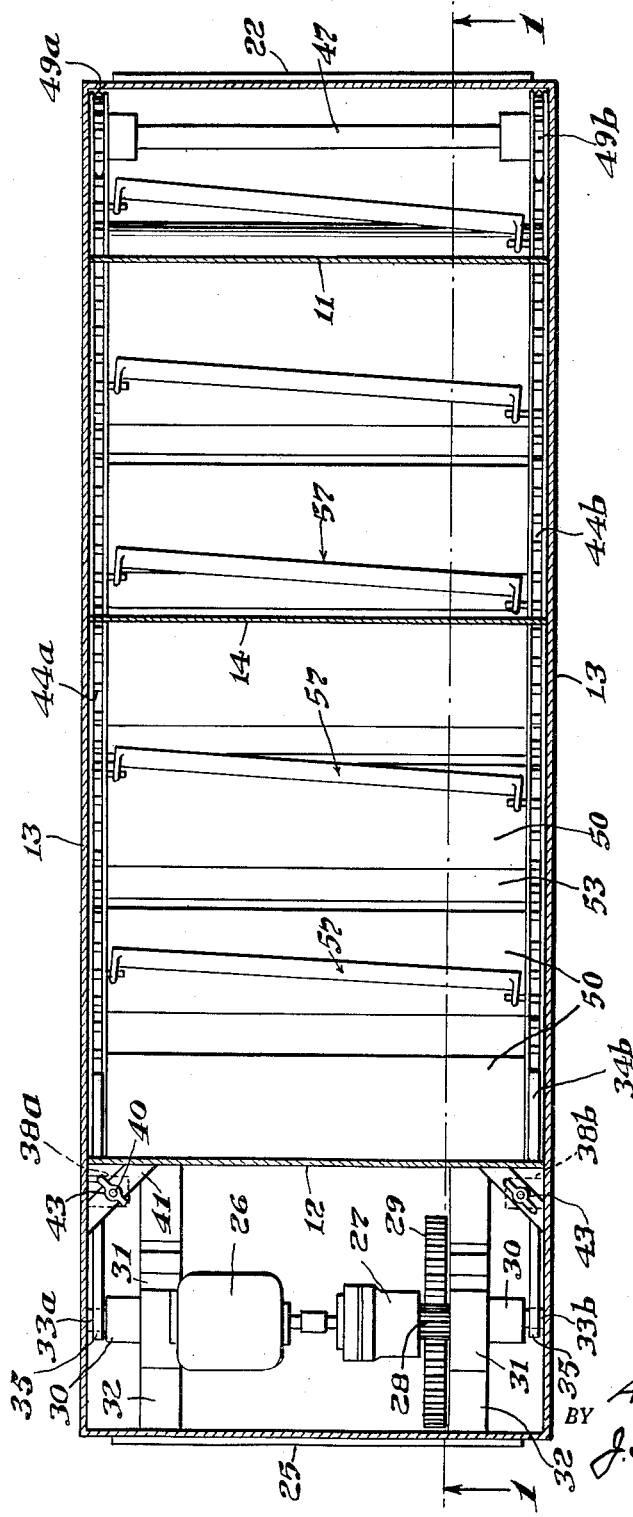

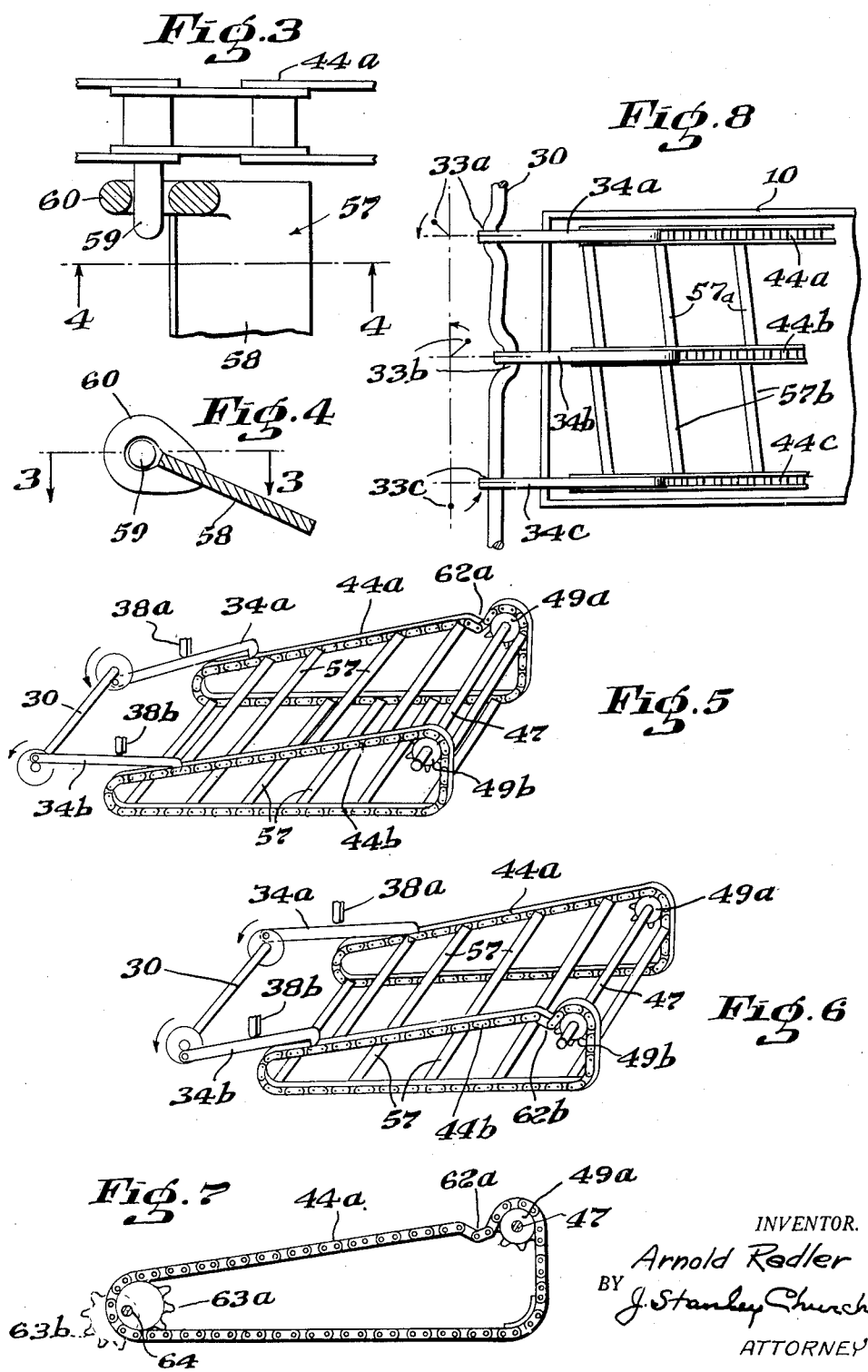

Patented Aug. 22, 1950

2,519,929

UNITED STATES PATENT OFFICE 2,519,929

BIN DISCHARGING APPARATUS

Arnold Redler, Stroud, England

Application August 30, 1949, Serial No. 113,159
In Great Britain August 13, 1948

11 Claims. (Cl. 222—415)

This invention relates to discharging apparatus of bins for powders and other flowable solid materials, more particularly flour, and similar materials which are apt to "bridge" within the bin and thus make it difficult to obtain a reliable and steady discharge from the bottom of the bin. Such materials are hereinafter mentioned as flour or equivalent.

It is the object of the invention to provide an improved form and construction of discharging apparatus which is extremely adaptable to bins of various sizes and for a large range of materials, the improved apparatus being simple to manufacture and reliable in operation. The invention is concerned more particularly with apparatus of the general form which is described in my United States Patent No. 1,416,416, issued May 16, 1922, and in which a unit for incorporation in the lower part of the bin comprises a frame-like structure spanned by a slotted false bottom, one or more endless articulated material detaching members or conveyors being arranged to encircle the false bottom and being driven so that the part of each conveyor member disposed above the false bottom acts to detach from the main bulk, and agitate, the flour or equivalent in its vicinity, thus causing it to fall in a divided form through the false bottom, on to the lower or return part of the said conveyor member, which part carries the flour or equivalent to a discharge opening.

According to the invention, a bin discharger for flour or equivalent comprises an apertured false bottom in the bin, a plurality of endless tension members driven to run across the upper surface of the false bottom, and return beneath it, and a series of cross-bars which extend laterally between adjacent tension members, and are loosely connected at their ends to the said tension members. Preferably the cross-bars are connected to the tension members by joints enabling the cross-bars to move angularly backwards and forwards relative to said tension members. Thus the adjacent tension members may be driven so as to have relative motion in the forward and rearward sense, the tension members each leading alternatively, so that the average speeds of said tension members are equal. Alternately the tension members may advance in unison but at a cyclically varying speed.

Conveniently the cross-bars are in the form of trailing flaps which are pivotally connected at their ends to the tension members, with freedom to move angularly up and down as they trail over the false bottom.

The tension members may be alternately advanced intermittently by driving means acting to move the tension members across the false bottom, advancing means being provided to move in unison those parts of the tension members extending below the false bottom. The advancing means may comprise a shaft which is coupled to both tension members and is rotated by whichever tension member is being moved by the driving means, the advancing means thus driving the return run of the other tension member.

Thus the advancing means can conveniently comprise a freely rotatable shaft having fast upon it a pair of wheels which intermesh with the tension members, each at the finish of their return run, both tension members having a substantial amount of slackness, which, for that tension member not being moved by the driving means, accumulates at the commencement of the upper run; and for that tension member being moved, accumulates at the commencement of the lower run.

If desired, the chains or tension members may be advanced intermittently by driving means comprising one or more oscillatory ratchet pawls arranged to pull the tension members across the false bottom; usually each of the tension members has its own oscillatory ratchet pawl. The ratchet pawls preferably operate with a phase difference so as to apply advancing movements in sequence to the tension members.

In another arrangement the tension members are advanced by driving means comprising non-concentric wheels, the portions of greater and smaller radius of each wheel causing the corresponding tension member to advance relatively quickly and slowly, alternately.

Normally each tension member comprises a closely articulated roller or like chain, the advancing means comprising a rotatable shaft having fixed thereon a sprocket for each tension member, the shaft thus acting to transmit motion from one tension member to the other or others.

In the preferred construction the cross-bars have at their ends, apertured lugs which engage loosely with pins projecting from the tension members.

The false bottom of the bin conveniently comprises a plurality of slat members, each of inverted channel shape in cross section. Each of the slat members can fit over a locating device secured to the sides of the bin, the locating device conveniently comprising, for each slat member, a pair of mutually parallel rods or tubes extending across the bin in spaced relationship, and spanned by the flanges of the slat member.

The invention is illustrated by way of example in the accompanying diagrammatic drawings, in which:

Figure 1 is a sectional elevation of a typical bin discharger suitable for the delivery of flour, the section being taken on the line 1—1 of Figure 2;

Figure 2 is a plan corresponding to Figure 1;

Figure 3 is a fragmentary plan of the connection between one end of a cross-bar and the corresponding tension member drawn to an enlarged scale, the cross-bar being partly shown in section taken on the line 3—3 of Figure 4;

Figure 4 is a fragmentary sectional elevation taken on the line 4—4 of Figure 3;

Figures 5 and 6 are perspective diagrams to show the operation of the device;

Figure 7 is a side elevation showing alternative means for driving the tension members;

Figure 8 is a plan showing the adaptation of the invention to a bin discharger having three tension members, these being driven by ratchet pawls having 120 degrees phase displacement; and Figure 9 is a sectional elevation of a modified structure for supporting and guiding the tension members at the discharge end of the bin.

The bin is indicated at 10 and is of rectangular shape in plan with a front wall 11, a rear wall 12 and two side walls 13. It is conveniently made of sheet metal and it has at its lower part a transverse sheet metal partition 14 welded between its side walls 13 so as to form a tie and at the same time act as a baffle to prevent bodily movement of the flour or equivalent in a rearward direction.

The bottom proper of the bin is indicated at 15 and is formed with a transverse outlet opening 16 through which the flour or equivalent is discharged in a constant stream when the bin discharger is in operation. The discharger is located immediately above the bottom 15 and comprises mainly a false bottom indicated generally at 17, a conveyor device indicated at 18 and driving means for the conveyor device which driving means are indicated generally at 19. For accommodating the discharger, the bottom part of the bin 10 has a front extension 20 formed with a lid 21 and detachable inspection cover 22; a corresponding and somewhat larger extension 23 is provided at the rear and has a top cover 24 and rear inspection cover 25.

This rear extension 23 accommodates the driving mechanism 19 which, in the installation shown, comprises an electric motor 26 connected through a reduction gear unit 27 with a pinion 28 running in mesh with a gear wheel 29 upon a crank shaft 30. This crank shaft 30 is mounted in bearings 31 carried by brackets 32 and it has at its ends a pair of crank pins 33a and 33b which are arranged at diametrically opposite positions so that they are 180 degrees out of phase. These crank pins drive the detaching device 18 through a pair of ratchet pawls 34a and 34b which are identical and are of the shape shown in Figure 1. Each has at its rear end an eye 35 which fits pivotally upon the corresponding crank pin 33a or 33b, while its forward end is formed with a downwardly pointing hook-like beak portion 36; the intermediate part of the ratchet pawl slidably engages with the lower edge 37 of a corresponding support member 38a or 38b acting as a fulcrum for the ratchet pawl.

The support members 38a, 38b are arranged in slides 39 so as to be adjustable vertically, the adjustment in each case being effected and locked by means of a screw 40 which is slidable through a fixed bracket 41 and is located by a nut 42 and wing nut 43.

The front extremities 36 of the ratchet pawls 34a, 34b are engageable with a pair of endless tension members in the form of closely articulated roller or like chains 44a and 44b disposed one at each side of the false bottom 17 as will be seen in Figure 2. At its rearmost part each chain passes around an adjustable or spring-urged curved guide 45 and then extends forwardly along the bottom 15 of the bin, past the discharge opening 16 and thence upwards around a fixed curved guide 46. Above the guide 46 the discharger has an advancing device comprising a transverse shaft 47 which is freely rotatable in a pair of bearing brackets, one of which is seen at 48, said shaft having rigidly secured to it a pair of sprockets 49a, 49b around which pass the chains 44a and 44b, the chains, as they leave the sprockets 49a, 49b, of course move on to the front of the false bottom 17. It will be noted from Figure 1 that there is a substantial amount of slack in the chains and this is purposely provided in order to produce an improved detaching action as will be hereinafter explained in greater detail.

The false bottom 17 is constituted by a number of slat members 50 which are made of sheet metal and are bent downwards at their front and rear edges as indicated at 51 so that they are of inverted channel shape in cross section; they fit snugly over consecutive pairs of metal tubes 52 which are fixed at their ends into the side walls 13 of the bin 10. Thus the upper surface of the false bottom 17 is substantially plane but is formed with lateral slot-like openings between the adjacent slat members 50. It will be noted, moreover, that the false bottom 17 is inclined downwardly towards its rear. The foremost slat member indicated at 50a is for convenience made wider than the others and its front edge is smoothly curved at 54 to form a guide for the chains 44a, 44b, an angle member 55 being fitted across the bin to support said front portion. The front wall 11 terminates a short distance above the false bottom 17 and it carries a baffle member 56 made of sheet rubber or like flexible material adapted to prevent flour or equivalent from flowing forwards over the false bottom 17. With this form of construction the false bottom is easy to manufacture and it can readily be dismantled merely by lifting off the channel-shaped slats 50.

A number of flights or cross-bars 57 are fitted at intervals between the chains 44a and 44b to constitute part of the conveyor device 18; each cross-bar being in the form of a strip 58 of metal which is connected at its ends to the chain 44a and 44b so as to be free to pivot up and down and also move angularly in the forwards and backwards sense. The construction of the connection is shown more clearly in Figures 3 and 4; occasional pivot pins of the chain (say the chain 44a) are extended to form inwardly directed projections and one of these is shown at 59 in Figure 3. This is loosely embraced by an eye 60 composed of circular shape welded or otherwise secured to the end of the strip 58. The eye 60 is circular in radial section as will be seen in Figure 3 and as it is a loose fit upon the projection 59, it enables the cross-bar 57 to move angularly about the axis of the projection 59 and also to move angularly through a small angle in the general plane of the false bottom 17.

As the crank shaft 30 revolves, the ratchet pawls 34a, 34b are moved forwards and backwards along the chains 44a, 44b between the side plates thereof and thus produce an intermittent rearward movement of the chains along the false bottom 17, for the beak portion 36 engages the successive pins or rollers of the chain during the rearward stroke of the ratchet pawl, although during the forward stroke thereof the ratchet pawl rides freely owing to the provision of the sloping surface 61. As the ratchet pawls 34a, 34b work 180 degrees out of phase, the chains 44a, 44b are moved alternately, each one remaining stationary while the other is moving, that is as far as the upper runs of the two chains are concerned. The crank shaft 30 rotates counterclockwise as viewed in Figure 1 so that the two supports 38a, 38b hold the ratchet pawls 34a, 34b positively downwards in engagement with the chains 44a, 44b during the operating stroke, as the crank pins 33a, 33b are then each at the top of its orbit. On the other hand during the return stroke or forward movement of the ratchet pawls 34a, 34b they are free to ride upwards over the chain pins or rollers as the crank pins are each at the bottom part of its orbit.

It will be seen, therefore, that the upper runs of the two chains 44a, 44b are always moving differentially with respect to one another and therefore the cross-bars 57, instead of advancing in constant parallel relationship to the front and rear walls 11 and 12, progress one end at a time alternately as they are pulled rearwards by the respective chains 44a, 44b. The differential motion considerably assists the cross-bars 57 to break up and detach the flour from the bottom of the mass within the bin 10, the cross-bars 57 trailing across the upper surface of the false bottom 17 and causing the detached flour to fall through the openings 53 onto the bottom 15 of the bin. The chains 44a, 44b and the cross-bars 57, where they rest upon the bottom 15 of the bin, are of course moving in a forward direction and thus carry the flour or equivalent bodily in a layer to a position over the discharge opening 16, the flour or equivalent automatically falling through said opening aided by the action of the flap-like trailing cross-bars 57 which naturally fall by gravity and thus disturb the layer of flour or equivalent as it reaches the discharge opening 16.

It is desirable that the lower runs of the chains 44a, 44b move in unison to provide an efficient en masse conveying action and this result is successfully achieved by the use of the advancing means comprising the shaft 47 carrying the two sprockets 49a, 49b. The action is shown more clearly in Figures 5 and 6. In Figure 5 the ratchet pawl 34a is on its forward or return stroke and it will be noted that the chain 44a is stationary on its upper run but has a slack portion 62a which is being produced in the following manner.

The ratchet pawl 34b is in operative engagement with the upper run of the chain 44b and as it is nearing the end of its stroke, the upper run of the chain 44b is taut so that the advancing movement of the chain causes the sprocket 49b to be turned, at the same time rotating the shaft 47 and sprocket 49a. Therefore the lower runs of the two chains 44a and 44b are moved in unison along the bottom of the bin 10, the advancing movement of the chain 44a around the sprocket 49a causing the slack to appear at 62a. During the next half revolution of the crank shaft 30 the ratchet pawl 34b stops driving the chain 44b but the ratchet pawl 34a comes into action. During the first part of the stroke, the upper run of the chain 44a is pulled rearwards, thus reversing the obliquity of the cross-bars 57 and taking up the slack at 62a and transferring it to the loop at the left end of the chain. From this point onwards the upper run of the chain 44a is taut so that the sprocket 49a is rotated and correspondingly turns the sprocket 49b causing the lower run of the chain 44b to move in unison with the lower run of the chain 44a, slack being formed in the chain 44b at 62b as shown in Figure 6.

The action can thus be summarized as follows. At the beginning of each operative or work stroke of a particular ratchet pawl, said ratchet pawl only has to move the upper run of the corresponding chain so that the load is relatively light; during this stage the lower run of the chain is stationary and both runs of the other chain are completely stationary. At a predetermined point in this stroke the slack is then taken up and the operative ratchet pawl then has to drive both of the lower runs of the chains to convey the flour or equivalent to the discharge opening; during this portion of the stroke, however, the upper run of the other chain still remains stationary.

It will be understood that the above is given only as an example and that various other means for driving the chains or equivalent tension members of the conveyor device can be used. Thus, in Figure 7 alternate advancement of the upper runs of the chains 42a, 42b is obtained by a pair of sprockets 63a, 63b, each mounted eccentrically upon a common driving shaft 64 and disposed 180 degrees out of phase. The chain 44a passes around the sprockets 63a and in similar manner, although not shown, the chain 44b passes around the sprocket 63b. Although the driving shaft 64 rotates at a constant speed, the velocity at which the chains 44a, 44b are advanced varies cyclically in accordance with the operating radius of the corresponding sprockets 63a or 63b so that for the greater part of the time the two chains 44a, 44b are moving differentially although their average speeds are the same. The result is the same as that described in connection with Figures 5 and 6, the shaft 47 of the advancing means causing the lower runs of the two chains 44a, 44b to be intermittently moved in unison while slack is formed alternately in the two chains as indicated at 62a in respect of the chain 44a.

In the modification shown in Figure 8, three tension members are provided at the bottom of the bin 10 and are indicated at 44a, 44b and 44c. Cross-bars 57a and 57b are connected between them as before and the tension members are intermittently advanced by means of three ratchet pawls 34a, 34b, and 34c; these are oscillated by a common crank shaft 30 which, however, in this instance has three crank pins 33a, 33b and 33c having a mutual phase difference of 120 degrees as indicated by the diagrams forming the left hand part of Figure 8. The intermittent motion which is imparted to the chains 44a, 44b and 44c causes the cross-bars 57a and 57b to change the sense of their inclination twice during each revolution of the crank shaft 30.

As illustrated in Figure 9, a modified form of guiding and supporting structure forming a part of the advancing device for the chains and designed to effect intermittent movement of the chains in unison along the lower runs during alternate movement of the chains along the upper run may comprise a pair of relatively large sprockets 100 mounted fast on a freely rotatable shaft 102 and over which the chains 44a, 44b may pass. In the modified embodiment, as shown, the sprockets 100 are disposed tangentially with the lower runs of the chains at the bottom, and are disposed below the upper runs of the chains at the top so that the slack may be more readily formed between the upper runs and the relatively lower tops of the sprockets, and also eliminating the fixed curved guides 46 and the relatively smaller sprockets 49a, 49b.

In some cases it may be desirable for the chains or equivalent tension members to be moved throughout in unison, in which event, of course, simple driving means may be employed, such for instance as concentrically mounted sprockets for producing uniform motion; if an intermittent motion in unison is required two or more ratchet pawls can be used, these, of course, being driven with an "in phase" relationship.

Combinations of the above methods are available; also modification in the bottom of the troughs of the detacher units can be made to ensure gradually increasing loads to be collected on the under chain in order that abstraction shall take place more or less under the whole area of the bottom of the bulk so that the bulk will sink preferably evenly when the bin discharged is in operation.

It will further be appreciated that in certain circumstances the invention includes the provision of a bin discharger combining in a single structure a plurality of more or less independent material detachers each comprising a chain and sprocket drive, and in which some or all of the chains may be run at the same speed. Also that in some cases the material detachers may be arranged so as to run at an angle to each other or in different directions.

It will be appreciated that the cross-bars in operation must be strong enough to cut through the bulk of material in the bin. The bars, therefore, may be thin and flat and in trailing they will present the thin edge to the cutting through of the material. At the same time they can trail in the easiest position and occasionally sweep the lands, and also on the return sweep the surface in the bottom, while moving the load which has fallen through the apertures. The discharger unit need have no projections on the outsides and consequently units may be placed close together when required for large bins.

Having thus described the invention, what is claimed is:

1. In a bin discharger of the character described, a conveyor element comprising a plurality of tension members; a series of flight members extending transversely between said tension members; means connecting the ends of said flight members with said tension members and allowing substantial movement of said tension members relative to each other; and driving means for positively moving said tension members relative to each other to alternately advance the opposite ends of said flight members.

2. In a bin discharger of the character described, a generally horizontal conveyor element comprising a plurality of endless tension members; a series of cross bars extending transversely between said tension members, said cross bars being swivelly connected to said tension members to allow angular movement of said cross bars in a generally horizontal plane and rocking movement thereof in a vertical plane relative to said tension members; and driving means for alternately advancing first one tension member and then the other.

3. In a bin discharger of the character described, a conveyor element comprising a plurality of endless tension members and a series of transversely extended flight members connected to and disposed between adjacent tension members and allowing substantial movement of said tension members relative to each other; and means for driving said conveyor element to effect said relative movement of said tension members, said driving means including a plurality of crank-operated arms, one for each of said tension members, said arms being out of phase and each arm cooperating with the respective tension member associated therewith to effect alternate intermittent movement of said tension members relative to each other.

4. In a bin discharger of the character described, a conveyor comprising a plurality of endless chains; a series of transversely extended flight members loosely connected to and disposed between said chains to permit independent relative movement of said chains; driving means including a plurality of crank-operated hooked arms, each arm having an idle stroke and a work stroke, said arms being arranged out of phase, and being engageable with a respective chain during its work stroke to effect alternate intermittent movement of said chains; and adjustable means cooperating with each hooked arm to maintain the same in operative engagement with its associated chain during the work stroke of the arm.

5. In a bin discharger of the character described, a conveyor element comprising a plurality of endless tension members and a series of transversely extending flight members loosely connected to, and disposed between adjacent tension members, to allow movement of said tension members relative to each other; and means for driving said conveyor element to effect said relative movement of said tension members, said driving means including a driven shaft and a plurality of wheels eccentrically mounted on said shaft and out of phase with each other, each wheel being drivingly engaged with a tension member, whereby to effect cyclically varying speeds of their respective tension members.

6. In a bin discharger of the character described, an endless conveyor having a plurality of endless elements, material moving members extending transversely between said elements, each element having upper and lower run portions, at least said upper run portions being movable relative to each other; means for driving said conveyor to effect alternate advancing movement of one upper run portion relative to the other upper run portion; and means operable in response to the alternate advancing movement of said upper run portions for effecting advancing movement in unison of said lower run portions.

7. A bin discharger of the character defined in claim 6, in which the means for advancing the lower run portions of the endless elements in unison includes a freely rotatable shaft; and a plurality of wheels fixed to said shaft, each wheel being in driving engagement with a separate one of said endless elements, said wheels being respectively rotatable by the advancing movement of the upper run portion of the endless element associated therewith.

8. In a bin discharger having an apertured false bottom through which material may fall and a real bottom below said false bottom provided with a discharge outlet; an endless conveyor cooperable with said false bottom and having an upper run movable across said false bottom and a lower run movable across said real bottom and across said discharge outlet, said conveyor comprising at least two chains and a series of cross bars disposed therebetween and swivelly connected thereto to permit relative movement of the chains with respect to each other and angular movement of the cross bars with respect to said chains; and driving means for positively moving said chains relative to each other to alternately advance the opposite ends of said flight members.

9. A bin discharger of the character defined in claim 8, in which the swivel connection between the cross bars and the chains includes apertured lugs at each end of the cross bars and pins projecting from the chains and loosely engaging the apertured lugs.

10. A bin discharger of the character defined in claim 8, in which the false bottom comprises a plurality of spaced slat members, each of inverted channel-shape in cross section; and means for mounting said slat members including spaced parallel rods adapted to extend across the bin and be spanned by the slat members.

11. In a bin discharger having an apertured false bottom through which material may fall and a real bottom below said false bottom provided with a discharge outlet, an endless conveyor having an upper run movable across said false bottom and a lower run movable across said real bottom and across said discharge outlet, said conveyor comprising at least two chains having substantial slack therein and a series of cross bars therebetween and swivelly connected thereto to permit relative movement of the chains with respect to each other and angular movement of the cross bars with respect to said chains; driving means for alternately effecting intermittent advancing movement of the upper runs of said chains so that one upper run is idle while the other is advancing; a curved guide for said chains at one end of the conveyor; an idler shaft at the other end of the conveyor; at least two sprockets fixed to said shaft, each of said chains being trained over said guide and a separate one of said sprockets and in driving engagement with its associated sprocket, the advancing upper run of one chain effecting rotation of said sprockets and causing the lower runs of the chains to advance in unison, the upper run of the idle chain at such time accumulating slack therein at a point adjacent its sprocket.

ARNOLD REDLER.

REFERENCES CITED

The following references are of record in the file of this patent:

UNITED STATES PATENTS

| Number | Name | Date |
|---|---|---|
| 1,416,416 | Redler | May 16, 1922 |
| 1,527,146 | Litchfield et al. | Feb. 17, 1925 |